Figure 1:
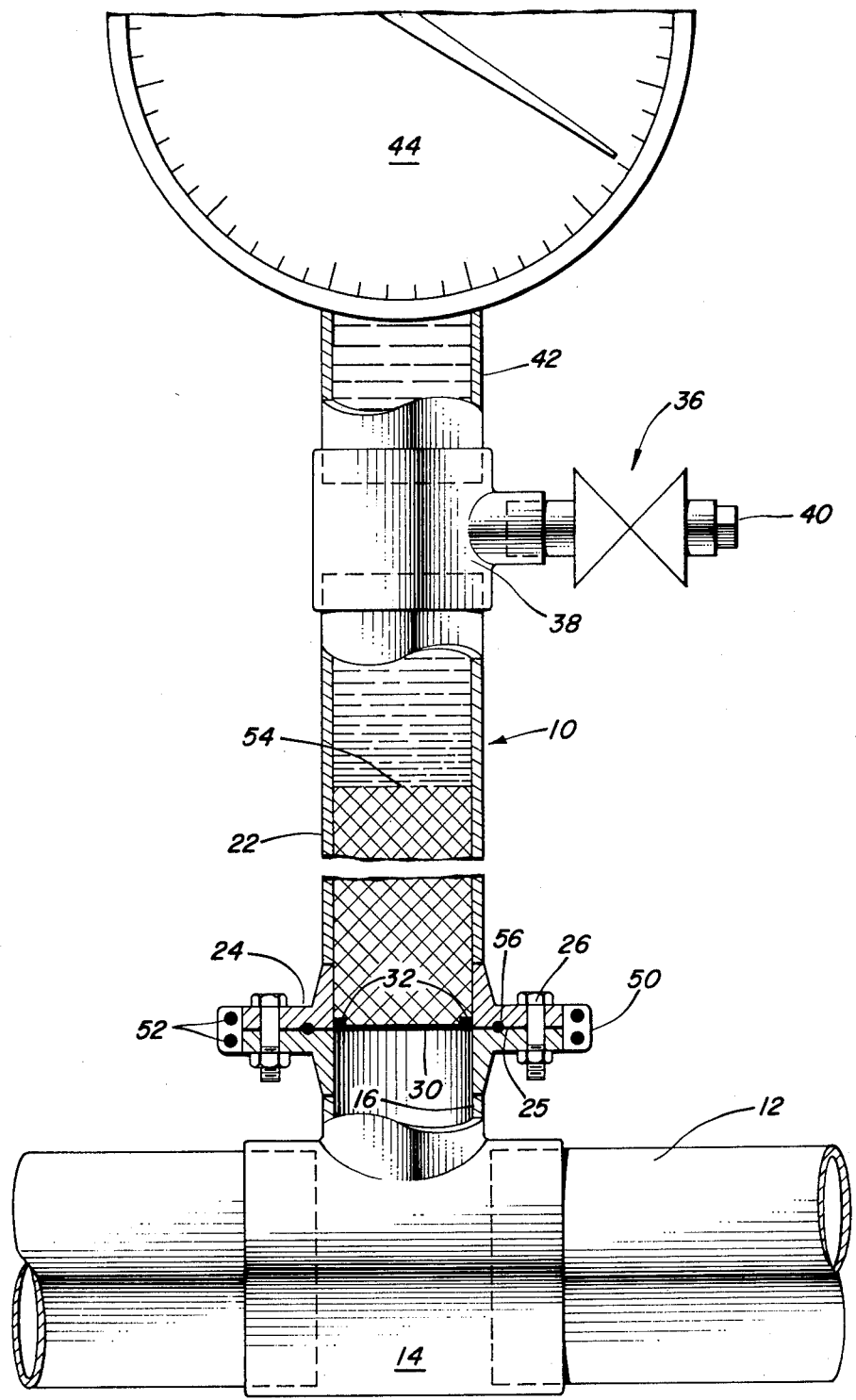

United States Patent [19]

Echtler et al.

[11] 4,283,954
[45] Aug. 18, 1981

[54] HIGH TEMPERATURE PRESSURE GAUGE

[75] Inventors: J. Paul Echtler, Pittsburgh; Roy O. Scandrol, Library, both of Pa.

[73] Assignee: Conoco Inc., Stamford, Conn.

[21] Appl. No.: 81,735

[22] Filed: Oct. 4, 1979

[51] Int. Cl.³ ............................................. G01L 7/08
[52] U.S. Cl. ....................................... 73/706; 73/715; 73/744
[58] Field of Search ................. 73/706, 708, 744, 745, 73/746, 732, 715

[56] References Cited

U.S. PATENT DOCUMENTS

| | | | |
|---|---|---|---|
| 2,481,651 | 9/1949 | Fitzpatrick | 73/706 |
| 2,881,617 | 4/1959 | Deis | 73/706 |
| 3,956,937 | 5/1976 | Lawford et al. | 73/706 |
| 3,986,399 | 10/1976 | Satou et al. | 73/706 |
| 3,999,435 | 12/1976 | Siegel | 73/708 |

*Primary Examiner*—Donald O. Woodiel
*Attorney, Agent, or Firm*—F. Lindsey Scott; William A. Mikesell, Jr.

[57] ABSTRACT

A high temperature pressure gauge comprising a pressure gauge positioned in fluid communication with one end of a conduit which has a diaphragm mounted in its other end. The conduit is filled with a low melting metal alloy above the diaphragm for a portion of its length with a high temperature fluid being positioned in the remaining length of the conduit and in the pressure gauge.

10 Claims, 1 Drawing Figure

U.S. Patent  Aug. 18, 1981  4,283,954

HIGH TEMPERATURE PRESSURE GAUGE

The present invention resulted from work performed persuant to a government contract granted by the Department of Energy (DoE Contract No. EX-76-C-01-1743).

This invention relates to a high temperature pressure gauge apparatus.

In many industrial applications it is desirable to determine the pressure of high temperature process streams. Such streams may have temperatures well in excess of the temperature which can be tolerated by most high temperature fluids making the determination of the pressure in the process streams difficult. Some such streams are molten salt streams, molten metal streams and the like.

In the preparation of the present application, the following references were considered.

U.S. Pat. No. 2,881,617—Deis; 3,956,937—Lawford, et al.; 3,986,399—Satou et al.; 3,999,435—Siegel. These references are hereby incorporated in their entirety by reference.

It has now been found that an effective high temperature pressure gauge apparatus for use in such applications comprises a conduit means having a pressure gauge positioned in fluid pressure sensing communication with a first end of the conduit means and a diaphragm positioned across a second end of the conduit means, with the conduit means being adapted to contain a low melting metal alloy positioned in the conduit means above the diaphragm to fill the conduit means to an intermediate level between the first end and the second end of the conduit means with the conduit means above the low melting alloy being filled with a thermally stable fluid so that the pressure gauge is in fluid pressure sensing communication with the diaphragm.

The FIGURE is a cross sectional view of an embodiment of the high temperature pressure gauge apparatus of the present invention.

In the FIGURE, a high temperature pressure gauge 10 is shown. Pressure gauge 10 comprises a conduit means 22 which is joined to a flange 24. Flange 24 comprises mating surfaces 25 joined together with bolts 26. Flange 24 also includes means for maintaining a diaphragm 30 in position across conduit 22. Diaphragm 30 is sealed in place by a gasket 32. Flange 24 is formed as a part of a tee 14 which is positioned in a line 12 which contains a high temperature process stream which is to be measured. Tee 14 includes a bore 16 which is desirably of substantially the same inside diameter as conduit 22. A low melting metal alloy is positioned in conduit 22 above diaphragm 30 to a height 54. A thermally stable fluid is positioned above height 54 in conduit 22 to substantially completely fill the remaining length of conduit 22 and a pressure gauge 44 which is desirably of the Bourdon tube type. A bleed valve shown generally as 36 is positioned in conduit 22 by means of a tee 38 which includes a plug 40 shown as a thumb screw for bleeding excess fluid from high temperature pressure gauge apparatus 10 during the filling operation. Conduit 22 is joined to pressure gauge 44 by a suitable fitting or the like.

A heating element 50, shown as a ring heater, is positioned about flange 24 which functions as a mounting means for diaphragm 30 so that during start-up operations, or optionally during normal operation, heat can be supplied to flange 24 to heat the low melting metal alloy positioned in conduit 22 as well as material in bore 16. Such results in liquefying any process material in bore 16 during start-up and in liquefying the low melting metal alloy positioned in conduit 22. The heating is accomplished by a pair of heating elements 52 shown positioned in ring heater 50. Desirably thermocouples 56 are positioned to monitor the temperature in flange 24 or in the low melting metal alloy positioned in conduit 22. Thermocouples 56 are shown positioned in flange 24.

In the use of the apparatus of the present invention the apparatus is degreased after fabrication to remove organic materials which may be volatile at the temperatures at which the high temperature apparatus is to be used and optionally the diaphragm may be pre-stressed through several flexing cycles if it is considered desirable. The diaphragm is positioned in flange 24 and ring heater 50 is installed. Molten low melting metal alloy is then positioned in conduit 22 above diaphragm 30. The remaining length of conduit 22 is then filled with a suitable high temperature fluid and the temperature is increased to a value substantially in excess of the melting point of the low melting metal alloy and the diaphragm—conduit assembly allowed to stand for a period of time sufficient for any retained gases in the molten metal to be evolved and any remaining hydrocarbons or other comtaminants which are volatile to be flashed off. Pressure gauge 44 is then filled by sealing the gauge, pulling a vacuum on the gauge and thereafter filling the gauge with the same high temperature fluid used to fill the upper portion of conduit 22. Pressure gauge 44 is then joined to the upper end of conduit 22 and the whole assembly is heated with any unneeded fluid being bled off through bleed valve 36. It is necessary that the apparatus when assembled be substantially completely full of liquid so that gaseous materials are not present. Such materials may result in the collapse of the diaphragm upon cooling, erroneous readings and the like.

Suitable metal alloys are those which have melting points below about 250° F. Some suitable metal alloys are shown in the Chemical Engineers Handbook, John H. Perry Editor, Third Ed., McGraw Hill Book Company, Inc., New York, Toronto and London 1950, page 454. Some such low melting metal alloys are Lippowitz Alloy, Woods Alloy, Darcet's Alloy, Cliche Metal, Rose's Alloy, and Bismuth Solder. The low melting metal alloy as indicated is positioned in the lower portion of conduit 22 and is desirably present in an amount sufficient to fill conduit 22 to a level sufficient to result in a sufficient length of conduit 22 being present above flange 24 to result in sufficient cooling between line 12 and level 54 so that the thermally stable liquid is operated below its maximum operating temperature. The thermally stable liquid can be selected from a variety of materials, however especially desirable results have been accomplished using Dow Corning silicon fluids which are stable up to about 650° F. The height of level 54 can obviously be varied over wide limits. Desirably, conduit 22 is positioned in a substantially vertical position although positions other than vertical could be used so long as sufficient vertical height is provided to maintain the low melting metal alloy in the lower portion of conduit 22. Suitable materials of construction for the high temperature pressure gauge apparatus are readily determined by those skilled in the art and need not be discussed in great detail although it has been found that desirable results were achieved when measuring the pressure of a high temperature flowing stream of molten zinc chloride using a diaphragm body of inconel 600, 0.002 inches thick with the gasket being formed of inconel 600 and the conduit being formed of 316 Stainless Steel pipe. The tees were also 316 Stainless Steel. Very desirable results were accomplished using Woods Alloy which has a nominal composition as follows: Bismuth, 48.4 percent; lead, 25.8 percent; tin, 12.9 percent; and cadmium, 12.9 percent. Desirable results were obtained with Dow Corning Silicon Fluid No. 704 which has an operating temperature limit up to about 650° F.

While it has been indicated that the cooling of conduit 22 is accomplished by varying the height of level 54 it is to be understood that other techniques could also be used such as fins positioned on conduit 22, heat exchange equipment positioned in contact with conduit 22 and the like. Such is not considered to be desirable but in the event that extreme temperature differences between line 12 and level 54 are to be accommodated it may be considered necessary. The present apparatus has been used in conjunction with lines which have a temperature up to about 1500° F. with no need for a height for level 54 beyond about 5 inches.

Having thus described the present invention by reference to certain of its preferred embodiments it is respectfully pointed out that the embodiments described are illustrative rather than limiting in nature and that many variations and modifications are possible within the scope of the present invention. Many such variations and modifications may be considered obvious and desirable by those skilled in the art upon a review of the foregoing description of preferred embodiments.

Having thus described the invention, we claim:

1. A high temperature pressure gauge apparatus, said apparatus comprising:
   (a) a conduit means;
   (b) a pressure gauge means positioned in fluid pressure sensing communication with a first end of said conduit means;
   (c) a diaphragm mounting means positioned near a second end of said conduit means;
   (d) a diaphragm means positioned in said diaphragm mounting means, said conduit means being adapted to contain a low melting metal alloy positioned in said conduit means above said diaphragm in an amount sufficient to fill said conduit means to a level between said first end of said conduit means and said second end of said conduit means, said conduit means being further adapted to contain a fluid, thermally stable at temperatures in excess of the melting point of said low melting metal alloy, said fluid substantially completely filling said conduit means above said low melting metal alloy and said pressure gauge; and,
   (e) a connecting means for positioning said diaphragm in pressure sensing communication with a high temperature fluid stream.

2. The apparatus of claim 1 wherein a heater means is positioned on said diaphragm mounting means for heating said low melting metal alloy.

3. The apparatus of claim 2 wherein a temperature sensing means is positioned in temperature sensing communication with said diaphragm mounting means for determining the temperature in said mounting means and in said low melting metal alloy.

4. A high temperature pressure gauge apparatus, said apparatus comprising:
   (a) a conduit means;
   (b) a pressure gauge means positioned in fluid pressure sensing communication with a first end of said conduit means;
   (c) a diaphragm mounting means positioned near a second end of said conduit means;
   (d) a diaphragm means positioned in said diaphragm mounting means;
   (e) a low-melting metal alloy positioned in said conduit means above said diaphragm, said low-melting metal alloy being present in an amount sufficient to fill said conduit means to a level between said first end of said conduit means and said second end of said conduit means;
   (f) a thermally stable liquid positioned above said low melting metal alloy in said conduit, said liquid being thermally stable at temperatures in excess of the melting point of said low melting metal alloy and present in an amount sufficient to substantially completely fill said conduit means above said low melting metal alloy and said pressure gauge means.

5. The apparatus of claim 4 wherein a heater means is positioned on said diaphragm mounting means for heating said low melting metal alloy.

6. The apparatus of claim 5 wherein a temperature sensing means is positioned in temperature sensing communication with said diaphragm mounting means for determining the temperature in said mounting means and in said low melting metal alloy.

7. The apparatus of claim 6 wherein said low melting metal alloy has a melting point below about 250° F.

8. The apparatus of claim 7 wherein said low melting metal alloy is selected from the group consisting of Lippowitz's Alloy, Woods Alloy, Darcet's Alloy, Cliche Metal, Rose's Alloy and Bismuth Solder.

9. The apparatus of claim 8 wherein said low melting metal alloy is Wood's Alloy.

10. The apparatus of claim 4 wherein said pressure gauge means is a Bourdon tube type pressure gauge.

* * * * *

UNITED STATES PATENT AND TRADEMARK OFFICE
CERTIFICATE OF CORRECTION

PATENT NO. : 4,283,954

DATED : August 18, 1981

INVENTOR(S) : J. Paul Echtler et al.

It is certified that error appears in the above—identified patent and that said Letters Patent is hereby corrected as shown below:

Column 1, line 35, "melting alloy" should read -- melting metal alloy --.

Column 1, line 63, insert -- 42 -- after the word "fitting".

Signed and Sealed this

Seventeenth Day of November 1981

[SEAL]

Attest:

GERALD J. MOSSINGHOFF

Attesting Officer     Commissioner of Patents and Trademarks